United States Patent [19]

Mochizuki et al.

[11] 4,234,892

[45] Nov. 18, 1980

[54] AGC CIRCUIT RESPONSIVE TO INTERMEDIATE GRAY LEVEL IN VIDEO SIGNAL

[75] Inventors: Hidetoshi Mochizuki, Kokubunji; Masataka Okada, Konosu, both of Japan

[73] Assignee: Clarion Co., Ltd., Tokyo, Japan

[21] Appl. No.: 972,700

[22] Filed: Dec. 26, 1978

[30] Foreign Application Priority Data

Dec. 29, 1977 [JP] Japan .................................. 52-159502

[51] Int. Cl.³ ............................................... H04N 5/52
[52] U.S. Cl. .................................... 358/174; 358/176; 358/178
[58] Field of Search ......................... 358/174, 176, 178

[56] References Cited

U.S. PATENT DOCUMENTS

| | | | |
|---|---|---|---|
| 2,691,697 | 10/1954 | Adler | 358/176 |
| 3,305,637 | 2/1967 | Loughlin et al. | 358/178 |
| 3,824,332 | 7/1974 | Horowitz | 178/5.1 |
| 4,022,972 | 5/1977 | Pires | 358/124 |

Primary Examiner—Robert L. Richardson
Attorney, Agent, or Firm—Biebel, French & Nauman

[57] ABSTRACT

An AGC circuit comprises a video IF amplifier for receiving a amplitude-modulated broadcast wave of a video signal with a signal level having a constant amplitude added thereto, a means connected to the output of said amplifier for generating a video detection output signal of said broadcast wave, and a means connected to the output of said generating means for detecting said signal level from the video detection output signal and for generating an output signal representing the signal level during the existing period of the signal level. The output signal representing the signal level is applied to the video IF amplifier and is used as a biasing signal of the amplifier. The signal level having a constant amplitude is a gray level existing intermediate between a black level and a white level.

1 Claim, 6 Drawing Figures

AGC CIRCUIT RESPONSIVE TO INTERMEDIATE GRAY LEVEL IN VIDEO SIGNAL

BACKGROUND OF THE INVENTION

The present invention relates to an automatic gain control (AGC) circuit employed in an amplitude modulation receiver system. More particularly, the present invention relates to an AGC circuit employed in an amplitude modulation receiver system receiving an amplitude-modulated (positive modulated) broadcast wave of a video signal, wherein the voltage representing a gray level included in a video detection output is utilized as an AGC voltage, the gray level existing intermediate between a black level and a white level.

Shown in FIG. 1 is a conventional AGC circuit of mean value type, which may be adapted for a receiver system receiving the amplitude-modulated broadcast wave of a normal video signal, the wave having the peak value (Ap-p) of a carrier wave. The AGC circuit is constructed so that the output of a video-intermediate frequency amplifier 10 is applied through a diode 11 to a transistor 12 so as to derive a video detection output from the emitter of the transistor, the video detection output is applied to a filter circuit formed of a resistor 13 and a capacitor 14, and then a d.c. voltage signal output from the filter circuit, as a bias signal, is applied to the video-IF amplifier 10 through an AGC amplifier 15. The reference numeral 16 represents a tuning circuit.

However, in the AGC circuit shown in FIG. 1, the mean value of the video signal may fluctuate in response to the brightness of a picture, even if the intensity of electric wave is constant, because the output voltage of the filter circuit corresponds to such mean value. It is apparent, therefore, that the illustrated AGC circuit has a disadvantage such that the AGC voltage may also fluctuate.

In addition, in order to avoid appearance of 60 Hz component of the video detection output in the AGC voltage, a time constant of the filter circuit must be selected to a relatively large value of the order of approximately 0.2 (sec.). This large value of the time constant is indication of the fact that the AGC thereof is less rapidly responsible than other AGC circuits such, for example, as a Keyed AGC circuit and a peak value AGC circuit of a negative modulated receiver system. Accordingly, it is also apparent that the prior art AGC circuit illustrated in FIG. 1 has a further disadvantage such that is cannot follow effectively the sudden fluctuation of electric field.

SUMMARY OF THE INVENTION

The present invention resides in avoiding the above-mentioned disadvantages.

The present invention discloses a novel AGC circuit which, in order to obtain a stable AGC voltage, includes an AGC detecting circuit or an AGC voltage generating source for receiving a video detection signal of an amplitude-modulated video signal, for detecting a signal level having a constant amplitude from the video detection signal, and for generating the corresponding signal of the signal level.

It is an object of the present invention to provide a novel automatic gain control circuit for an amplitude modulation receiver.

Another object of the invention is to provide an AGC circuit utilizing a gray level, which is included in a video detection output and existing intermediate between a black level and a white level, in order to obtain a stable AGC voltage.

A still further object of the invention is to provide a novel AGC circuit for an amplitude modulation receiver system, whereby the circuit is capable of highly effectively responding to the sudden fluctuation of electric field.

These and other objects and advantages of the present invention will appear more clearly from the following detailed disclosure read in conjunction with the accompanying drawings.

DESCRIPTION OF THE PREFERRED EMBODIMENT

Figure 1:
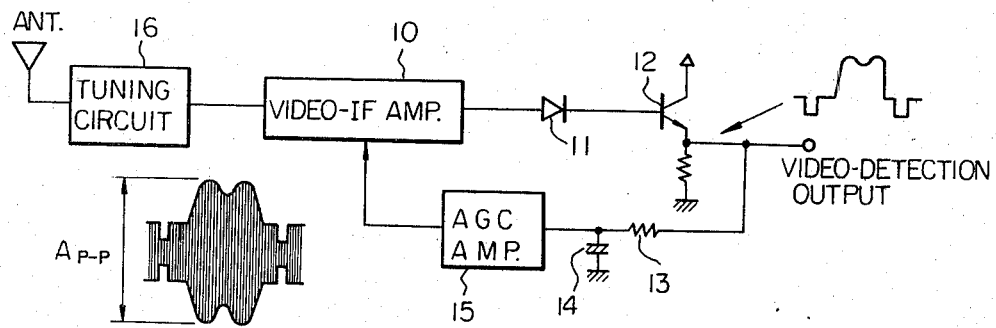
FIG. 1 is a block diagram showing a prior art AGC circuit of mean value type.
Figure 2:
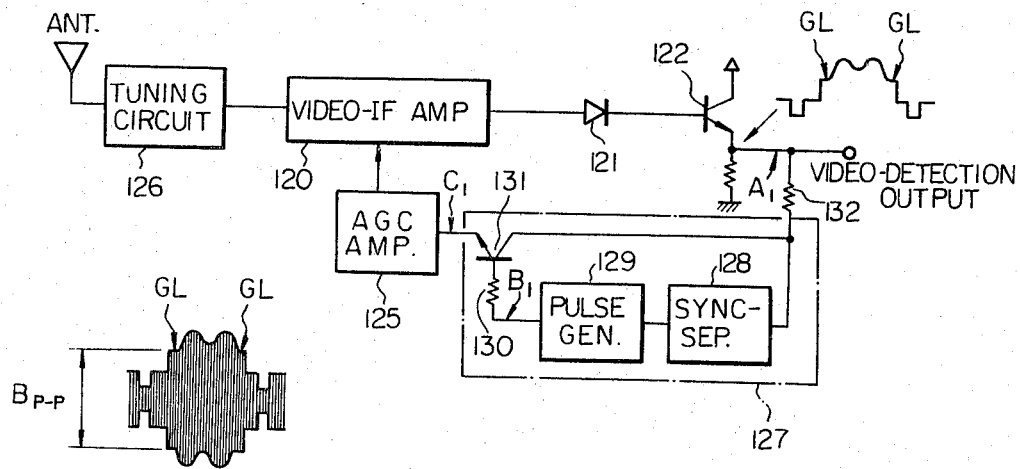
FIG. 2 is a block diagram showing one embodiment of the present invention utilizing a gray level.

FIG. 2 shows a concrete construction of an AGC circuit according to the present invention, for use in a receiver system receiving the amplitude-modulated broadcast wave of a video signal added with a gray level having a constant amplitude at all times, independently of the contents of the video signal. In comparison with the prior art AGC circuit, the AGC circuit of this invention is in characterized that an AGC detecting circuit 127 is connected between the emitter of a transistor 122 and the input of an AGC amplifier 125. The AGC detecting circuit 127 comprises a sync-separator 128 for taking out a synchronous signal of a video carrier wave, pulse generator 129, a resistor 130 and a transistor 131 which functions as a switching element. The emitter of the transistor 122 is connected through the resistor 132 to the input of the sync-separator 128 and to the collector of the transistor 131, respectively, the output of the sync-separator is connected to the input of the pulse generator 129, and the output of the pulse generator is connected through the resistor 130 to the base of the transistor 131. The emitter of the transistor 131 is connected to the video-IF amplifier 120 through the AGC amplifier 125, whereby biasing the video-IF amplifier. The reference numeral 126 represents a tuning circuit.

Figure 3:
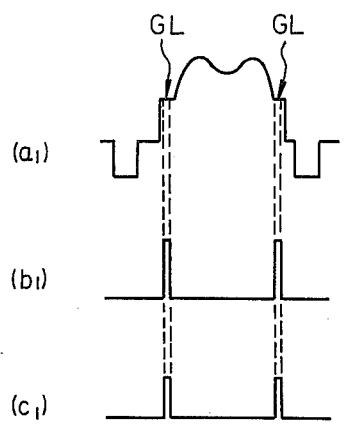
FIG. 3 is a signal wave-form diagram in relation to the AGC circuit shown in FIG. 2.

In FIG. 3, the reference characters $(a_1)$, $(b_1)$ and $(c_1)$ show signal wave-forms at the points $A_1$, $B_1$ and $C_1$, respectively, of the AGC circuit as shown in FIG. 2, and, referring to these wave-forms, the operation of the AGC circuit will be explained as follows.

A video detection output signal having a gray level GL shown in FIG. 3-($a_1$), which appears at the emitter of the transistor 122, i.e., at the point $A_1$, is applied to the collector of the transistor 131 which functions as a switching element and, at the same time, to the input of the sync-separator 128. The sync-separator takes out a synchronous signal of a video carrier wave, which is applied to the pulse generator 129. The pulse generator generates at its output (point $B_1$), in response to the input synchronous signal, a pulse signal which is shown in FIG. 3-($b_1$) and which represents the period during which the gray level GL in the video detection output signal exists. This pulse signal is applied to the base of the transistor 131 through the resistor 130, and thus, during the period of the pulse signal, the transistor 131 is in an ON condition. Accordingly, with the ON condition, the resulting signal representing the value of the gray level in the video detection output signal is output as an AGC voltage supply at the emitter of the transistor 131, that is, at the point $C_1$, as shown in FIG. 3-(c1), and the output signal from the emitter then is set in a predetermined AGC voltage through the AGC amplifier 125.

As stated in the above, unlike the prior art AGC circuit which operates to keep the peak value (Ap-p) of the carrier wave constant, the AGC circuit according to the present invention operates to keep the gray level value (Bp-p) of the carrier wave constant, as shown in FIG. 2, and, further, the gray level GL has a constant amplitude independently of the contents of video signal. Therefore, the AGC circuit according to the present invention is capable of providing a stable AGC voltage.

Figure 4:
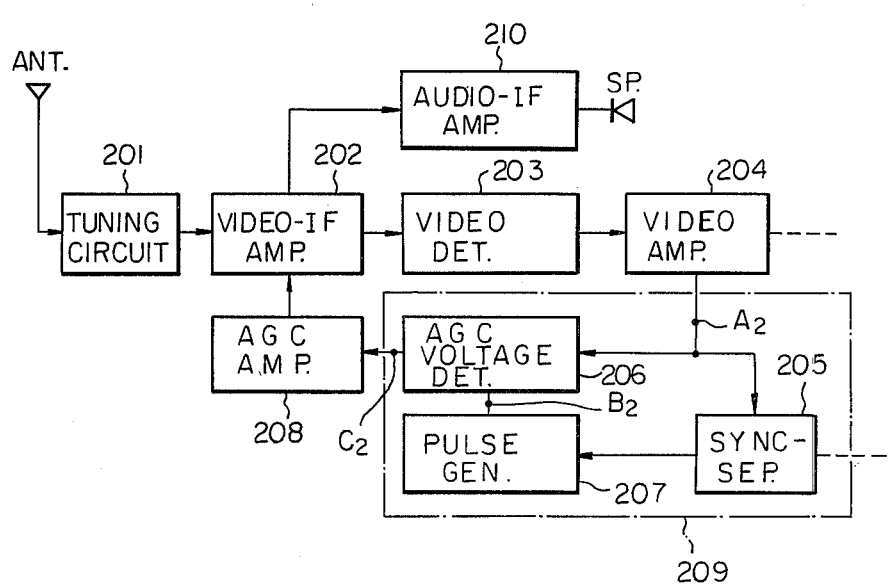
FIG. 4 is a block diagram showing another embodiment of the present invention utilizing a gray level.

Referring now to FIG. 4, a concrete construction of another AGC circuit of the present invention is shown, in which the AGC circuit may be employed in a receiver system receiving the amplitude-modulated broadcast wave of a video signal including a gray level GL having a constant amplitude at all times, independently of the contents of the video signal. In FIG. 4, the AGC circuit comprises a video intermediate frequency amplifier 202, a video detector 203, a video amplifier 204, a sync-separator 205, an AGC voltage detecting circuit 206, a gating pulse generator 207 and an AGC amplifier 208 and, further, an AGC voltage generating source 209 comprises the sync-separator 205, the AGC voltage detector 206 and the gating pulse generator 207. The reference numerals 202 and 210 represent a tuning circuit and an audio intermediate frequency amplifier, respectively.

The operation of the AGC circuit of FIG. 4 will be explained as follows.

The output of the video amplifier 204, that is, the video detection output signal which is obtained at the point $A_2$ and which includes a gray level GL, is input to the sync-separator 205. The sync-separator takes out a horizontal synchronous signal which is included in the video detection output, and then applies the synchronous signal to the gating pulse generator 207. The pulse generator generates at its output (point $B_2$), in response to the input synchronous signal, a gating pulse signal which represents approximately the period during which the gray level GL in the video detection output signal exists. This gating pulse signal is applied to the gating input of the AGC voltage detecting circuit 206. At the same time, the video detection output signal from the video amplifier 204 is applied to another input of the AGC voltage detecting circuit 206, and, therefore, during the existing period of the gating pulse signal, the AGC voltage detecting circuit 206 generates at its output (point $C_2$) the video detection output signal, in other words, a signal representing the value of the gray level GL. Then, the output of the AGC voltage detecting circuit 206, that is, the output of the AGC voltage generating source 209, is set in a predetermined AGC voltage through the AGC amplifier 208, and is applied to the video-IF amplifier 202 for biasing thereof.

In addition, according to the present invention, the filter circuit in the AGC amplifier may be designed such that the time constant of the filter is longer than the period of a horizontal synchronous pulse, i.e., 63.5 μsec. and is far smaller than the time constant (0.2 sec.) of the prior art AGC circuit of mean value type, and, therefore, the AGC circuit according to this invention can follow effectively the sudden fluctuation of electric field.

What is claimed is:

1. An automatic gain control circuit for an amplitude modulated receiver system for receiving an amplitude modulated video signal of the type having a gray level of a constant amplitude existing intermediately between a black level and a white level for use as a reference level, said circuit comprising:

video intermediate frequency amplifier means for receiving said amplitude modulated video signal, means connected to the output of said amplifier means for generating a video detection output signal in response to said video signal, and means connected to the output of said generating means for detecting the gray level from said video detection output signal and for generating an output signal representing the amplitude of the gray level signal during the existing period of said gray level, whereby said output signal representing the amplitude of said gray level signal is used as an AGC voltage by said amplifier means.

* * * * *

UNITED STATES PATENT AND TRADEMARK OFFICE
CERTIFICATE OF CORRECTION

PATENT NO. : 4,234,892
DATED : November 18, 1980
INVENTOR(S) : Mochizuki et al.

Figure 5:
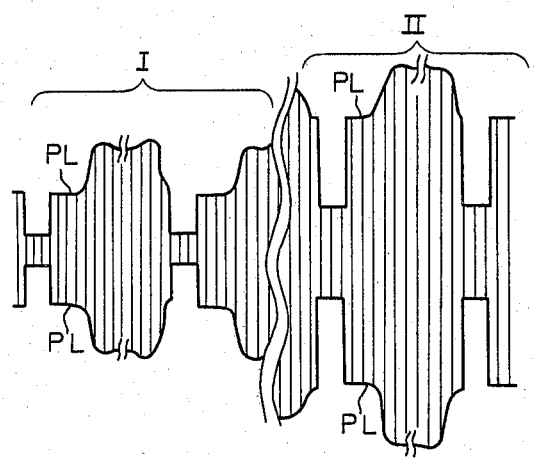
Figure 6:
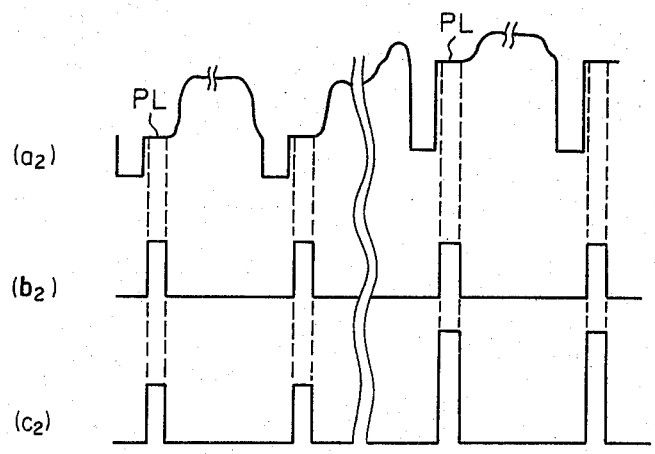

It is certified that error appears in the above—identified patent and that said Letters Patent are hereby corrected as shown below:

Figures 5 and 6 should be deleted.

Signed and Sealed this

Eighteenth Day of August 1981

[SEAL]

Attest:

GERALD J. MOSSINGHOFF

Attesting Officer     Commissioner of Patents and Trademarks